(No Model.)
H. N. TIMMS.
POLE AND SHAFTS FOR VEHICLES.
No. 387,125. Patented July 31, 1888.
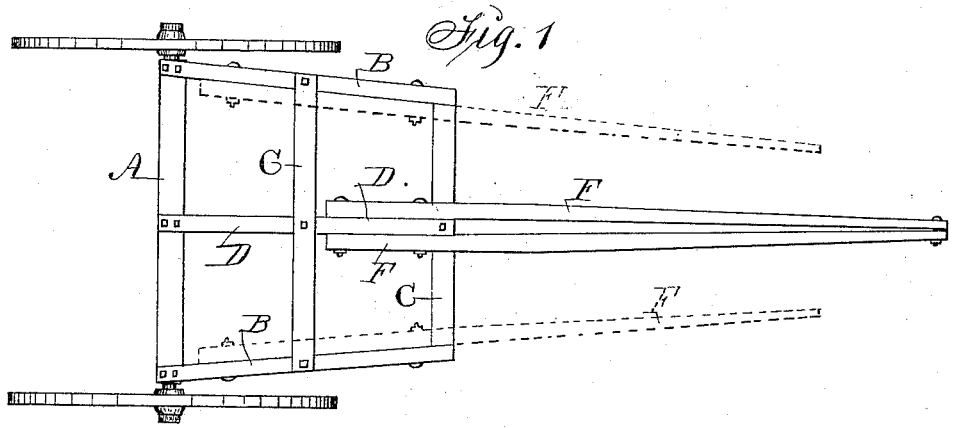
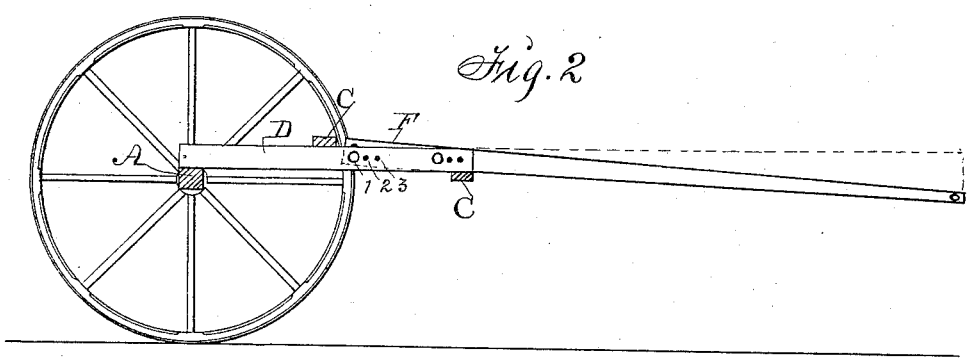
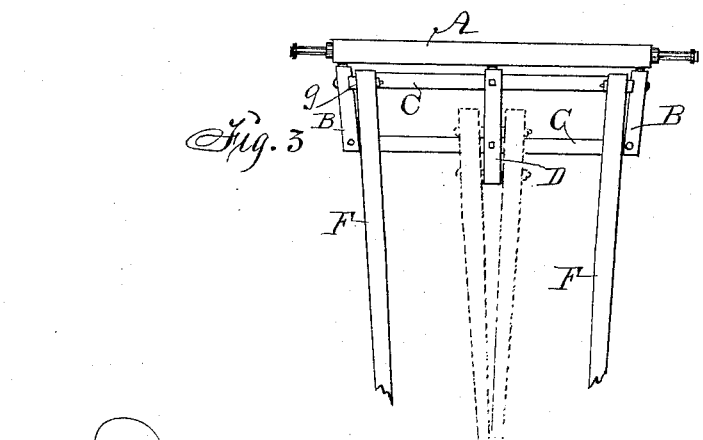
Witnesses:
R. H. Orwig,
M. P. Smith.
Inventor:
Harvey N. Timms,
By Thomas & Orwig, Atty.

UNITED STATES PATENT OFFICE.

HARVEY N. TIMMS, OF DES MOINES, IOWA.

POLE AND SHAFTS FOR VEHICLES.

SPECIFICATION forming part of Letters Patent No. 387,125, dated July 31, 1888.

Application filed March 24, 1888. Serial No. 268,363. (No model.)

*To all whom it may concern:*

Be it known that I, HARVEY N. TIMMS, a citizen of the United States of America, and a resident of Des Moines, in the county of Polk and State of Iowa, have invented a new and useful Improvement in an Interchangeable Pole and Shafts for Vehicles, of which the following is a specification.

Heretofore two pieces adapted to be detachably fixed to the hound-frame of a carriage have also been detachably connected with the center of the cross-bar of said frame and the axle by means of metallic plates pivoted to their rear ends, as shown in the United States Letters Patent No. 178,861, issued June 20, 1876. Such pieces have also been detachably connected and interchangeably used as shafts for a single horse and as a pole for hitching two horses to a vehicle by fastening them to two parallel cross-bars that were fixed to the hounds, as shown in United Letters Patent No. 313,128, issued to me on the 3d day of March, 1885; but in no instance has provision been made to adjust such shafts as required to suit animals of different size; and my invention consists in the construction and combination of two detachable and adjustable pieces and a frame, as hereinafter set forth, in such a manner that the front end of the pole can be raised or lowered and the same pieces, when used as shafts, adjusted as required to spread or separate their front ends to adapt them to horses of different size.

Figure 1 of the accompanying drawings is a top view, and Fig 2 a vertical and longitudinal sectional view, of a carriage showing the pieces applied to the opposite sides of a bar fixed to the center of the axle to serve as a pole that can be adjusted vertically and also longitudinally. Dotted lines in Fig. 1 indicate how the same pieces are to be applied to serve as shafts. Fig. 3 shows a modification of the device in which the hound-frame is hinged to the axle and the bar in the center, to which the pole is attached, extended forward from the bar C.

A represents a vehicle-axle.

B are the side pieces and C the cross-pieces of a frame connected with the axle.

D is a piece fixed to centers of the cross-pieces C and provided with perforations 1 2 3.

F F are mating pieces adapted to serve as a pole and also as shafts. They have perforations at their rear end at different points of elevation, as shown in Fig. 2, through which bolts can be passed, as required, to clamp them fast against the sides of the central bar, D, of the frame, and also, as required, to raise or lower their front ends. In Fig. 3 the pieces F are clamped to the inside faces of the side pieces, B, in the same manner or in any suitable way, so that they can be adjusted longitudinally and vertically and also laterally. To adjust them laterally, I place a flanged block or washers, $g$, that have slots through which bolts are passed on the insides of the pieces B in such a manner that they can be moved backward or forward to retain the pieces F at various distances apart at their front portions as required to produce shafts adapted for horses of different size.

I claim as my invention—

1. The pole-pieces F, having perforations in their rear ends adapting them for vertical and longitudinal adjustment, in combination with the central bar, D, in the manner set forth, for the purposes stated.

2. The pieces F, having perforations in their rear ends, and blocks or washers $g$, in combination with the side pieces, B, of the hound-frame of a vehicle, for the purposes stated.

HARVEY N. TIMMS.

Witnesses:
M. P. SMITH,
THOMAS G. ORWIG.